US011258158B2

(12) United States Patent
Foes et al.

(10) Patent No.: US 11,258,158 B2
(45) Date of Patent: Feb. 22, 2022

(54) APPARATUS AND METHOD FOR PROVIDING LINEAR MOTION OF A DEVICE

(71) Applicant: Raytheon Company, Waltham, MA (US)

(72) Inventors: Scott R. Foes, Torrance, CA (US); Ray McVey, Redondo Beach, CA (US); Andrew L. Bullard, Manhattan Beach, CA (US)

(73) Assignee: Raytheon Company, Waltham, MA (US)

( * ) Notice: Subject to any disclaimer, the term of this patent is extended or adjusted under 35 U.S.C. 154(b) by 1225 days.

(21) Appl. No.: 15/679,522

(22) Filed: Aug. 17, 2017

(65) Prior Publication Data

US 2019/0058237 A1 Feb. 21, 2019

(51) Int. Cl.
| | |
|---|---|
| *H01Q 1/12* | (2006.01) |
| *H01Q 1/28* | (2006.01) |
| *G12B 5/00* | (2006.01) |
| *G02B 7/00* | (2021.01) |
| *G02B 7/04* | (2021.01) |
| *H02K 41/02* | (2006.01) |
| *H01Q 3/00* | (2006.01) |
| *B64G 1/22* | (2006.01) |

(52) U.S. Cl.
CPC ............. *H01Q 1/125* (2013.01); *G02B 7/003* (2013.01); *G02B 7/04* (2013.01); *G12B 5/00* (2013.01); *H01Q 1/288* (2013.01); *B64G 1/222* (2013.01); *G02B 7/004* (2013.01); *G02B 7/005* (2013.01); *H01Q 3/005* (2013.01); *H02K 41/02* (2013.01)

(58) Field of Classification Search
CPC ........ H01Q 1/125; G02B 7/003; G02B 7/005; G12B 5/00; H02K 41/02
See application file for complete search history.

(56) References Cited

U.S. PATENT DOCUMENTS

| | | | |
|---|---|---|---|
| 3,672,231 | A | 6/1972 | Shinn et al. |
| 4,706,374 | A | 11/1987 | Murakami |

(Continued)

FOREIGN PATENT DOCUMENTS

| | | |
|---|---|---|
| JP | 64000427 A | 1/1989 |
| JP | H03134589 A | 6/1991 |
| JP | 2005003736 A | 1/2005 |
| WO | 2016025718 A1 | 2/2016 |

OTHER PUBLICATIONS

International Search Report and Written Opinion regarding International Application No. PCT/US2018/026664, dated Jul. 17, 2018, 16 pages.

(Continued)

*Primary Examiner* — Randell J Krug

(57) ABSTRACT

A system includes a compound flexure having a frame, a flexure, and a post flexure. The frame has an axis, and the flexure is located within the frame. The flexure is movable relative to the frame, and the frame and the flexure form at least part of a monolithic structure. The post flexure extends along the axis and engages the flexure. The system also includes a device coupled to the flexure and configured to move with the flexure relative to the frame. The system further includes an actuator coupled to the flexure and configured to move the flexure and the device relative to the frame.

20 Claims, 9 Drawing Sheets

(56) References Cited

U.S. PATENT DOCUMENTS

| | | | |
|---|---|---|---|
| 4,882,933 | A | 11/1989 | Petersen et al. |
| 5,165,279 | A | 11/1992 | Norling et al. |
| 5,369,996 | A | 12/1994 | Christen et al. |
| 5,594,170 | A | 1/1997 | Peters |
| 5,644,083 | A | 7/1997 | Newell et al. |
| 5,946,969 | A | 9/1999 | Munekata et al. |
| 6,263,735 | B1 | 7/2001 | Nakatani et al. |
| 6,813,225 | B2 | 11/2004 | Widdowson et al. |
| 7,117,724 | B1 | 10/2006 | Goodberlet et al. |
| 9,222,956 | B2 | 12/2015 | Bullard |
| 9,370,865 | B1 * | 6/2016 | Vangal-Ramamurthy .................. B25J 17/0208 |
| 9,733,448 | B1 | 8/2017 | Bibeault |
| 2006/0254375 | A1 | 11/2006 | Shoji |
| 2008/0229566 | A1 | 9/2008 | Saito |
| 2010/0212426 | A1 | 8/2010 | Oshio |
| 2012/0304769 | A1 | 12/2012 | Watanabe et al. |
| 2016/0079512 | A1 | 3/2016 | Fathi et al. |
| 2019/0023371 | A1 * | 1/2019 | Zimmerman ......... F16B 5/0216 |

OTHER PUBLICATIONS

Awtar et al.; "Design of a Large Range XY Nanopositioning System"; Proceedings of the ASME 2010 International Design Engineering Technical Conferences and Information in Engineering Conference; Montreal, Quebec, Canada; Aug. 15-18, 2010; 13 pages.

Physik Instruments; "High Precision Nanopositioning Stage: High-Dynamics, Very Stable Piezo Scanner with Extreme Guiding Accuracy P-752"; Datasheet; www.pi.ws; Jan. 30, 2015; 11 pages.

Notification of Transmittal of the International Search Report and the Written Opinion of the International Searching Authority, or the Declaration dated Jan. 13, 2015, in connection with International Patent Application No. PCT/US2014/057495; 12 pages.

Office Action dated Mar. 9, 2021 in connection with Japanese Patent Application No. 2020-508520, 10 pages.

Office Action dated Jun. 1, 2021 in connection with Japanese Patent Application No. 2020-508520, 11 pages.

* cited by examiner

APPARATUS AND METHOD FOR PROVIDING LINEAR MOTION OF A DEVICE

TECHNICAL FIELD

This disclosure relates generally to motion control of a device. In particular, this disclosure relates to an apparatus and method for providing linear motion of a device.

BACKGROUND

Various mechanisms for providing linear motion of devices are known, such as focus mechanisms that provide linear motion of optical instruments while limiting unwanted motion of the optical instruments. For example, some conventional mechanisms use flexure bearings that permit linear movement of devices while reducing or preventing rotational movement of the devices. However, these conventional mechanisms often suffer from a number of shortcomings, such as optical alignment slippage, susceptibility of undesirable deviations from desired motion paths, high design complexity, and challenging assembly processes. For satellite applications, these conventional mechanisms also suffer from vulnerability to high loads during launch.

SUMMARY

This disclosure provides an apparatus and method for providing linear motion of a device.

In a first embodiment, an apparatus includes a compound flexure having a frame, a flexure, and a post flexure. The frame has an axis, and the flexure is located within the frame. The flexure is movable relative to the frame, and the frame and the flexure form at least part of a monolithic structure. The post flexure extends along the axis and engages the flexure.

In a second embodiment, a system includes a compound flexure having a frame, a flexure, and a post flexure. The frame has an axis, and the flexure is located within the frame. The flexure is movable relative to the frame, and the frame and the flexure form at least part of a monolithic structure. The post flexure extends along the axis and engages the flexure. The system also includes a device coupled to the flexure and configured to move with the flexure relative to the frame. The system further includes an actuator coupled to the flexure and configured to move the flexure and the device relative to the frame.

In a third embodiment, a method includes adjusting a position of a flexure within a compound flexure using an actuator to move the flexure relative to a frame of the compound flexure. The method also includes adjusting a position of a device coupled to flexure relative to the frame. The frame has an axis, and the flexure is located within the frame. The frame and the flexure form at least part of a monolithic structure. A post flexure of the compound flexure extends along the axis and engages the flexure between the actuator and the device.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 9B, described below, and the various embodiments used to describe the principles of the present disclosure in this patent document are by way of illustration only and should not be construed in any way to limit the scope of the disclosure. Those skilled in the art will understand that the principles of the present disclosure may be implemented in any type of suitably arranged device or system.

As described above, various mechanisms for providing linear motion of devices can suffer from various shortcomings. These shortcomings are due to a number of factors. For example, conventional mechanisms for providing linear motion can have a low off-axis stiffness that results in high loads within dynamic vibration environments, and high loads can result in mechanism performance degradation or damage. Moreover, complex assemblies can be difficult to assemble and may be prone to joint slippage and alignment shifts. In addition, components may allow motion that is not linear to occur, which can cause moving optics or other components to deviate from a desired path.

In accordance with this disclosure, mechanisms for providing linear motion are provided that reduce or eliminate these issues. Among other things, these mechanisms employ a low part count, a low stiffness along an actuated axis, high off-axis stiffness, and extremely straight motion. The mechanisms can use an easy-to-manufacture one-piece flexure that improves performance, decreases complexity, and provides a scalable device. For instance, the mechanisms can employ a monolithic flexure that can be easily scaled and tuned for different-sized optics and operating environments.

Figure 1:
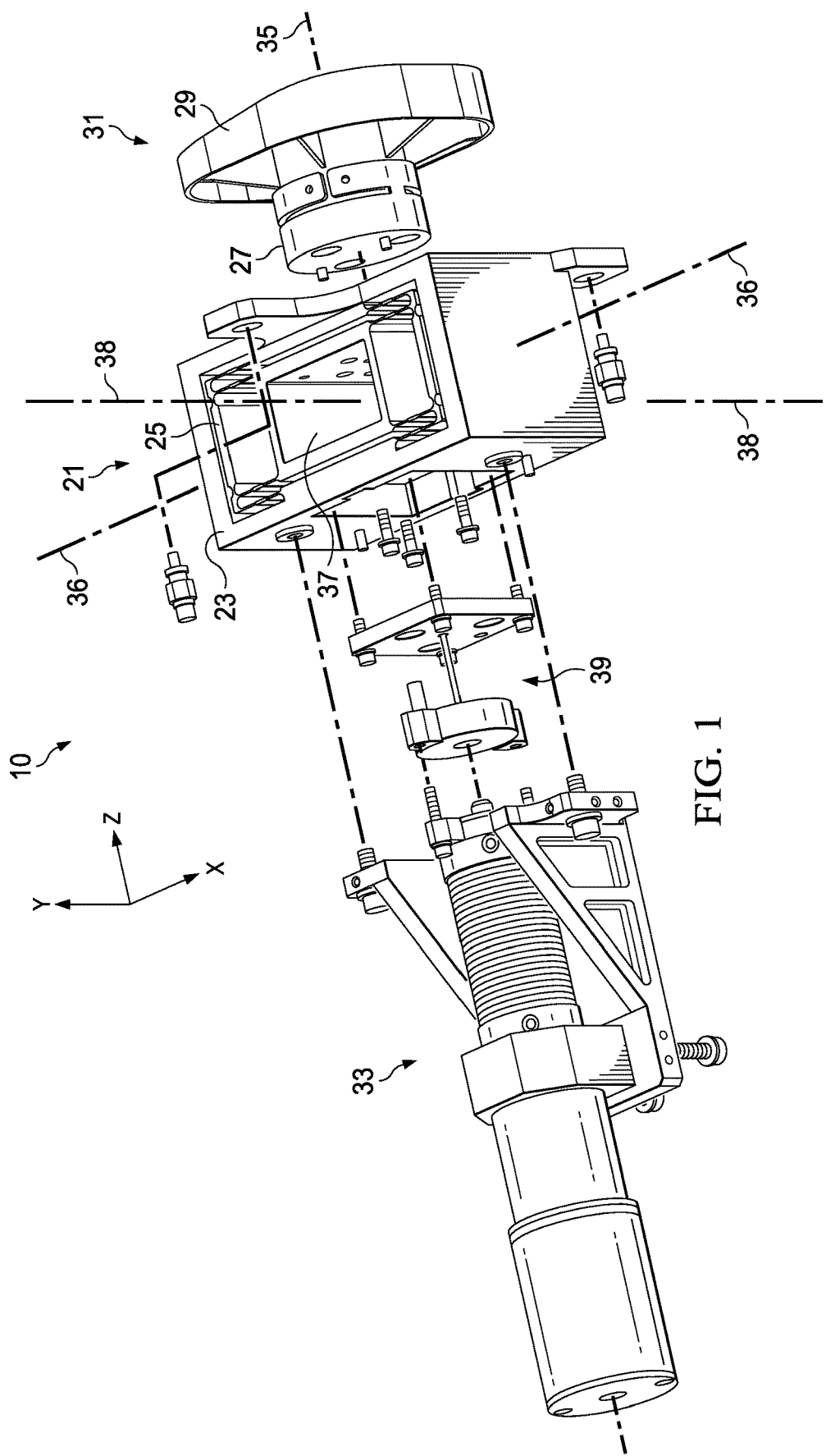
FIGS. 1 and 2 illustrate a first example optical focus mechanism according to this disclosure.
Figure 2:
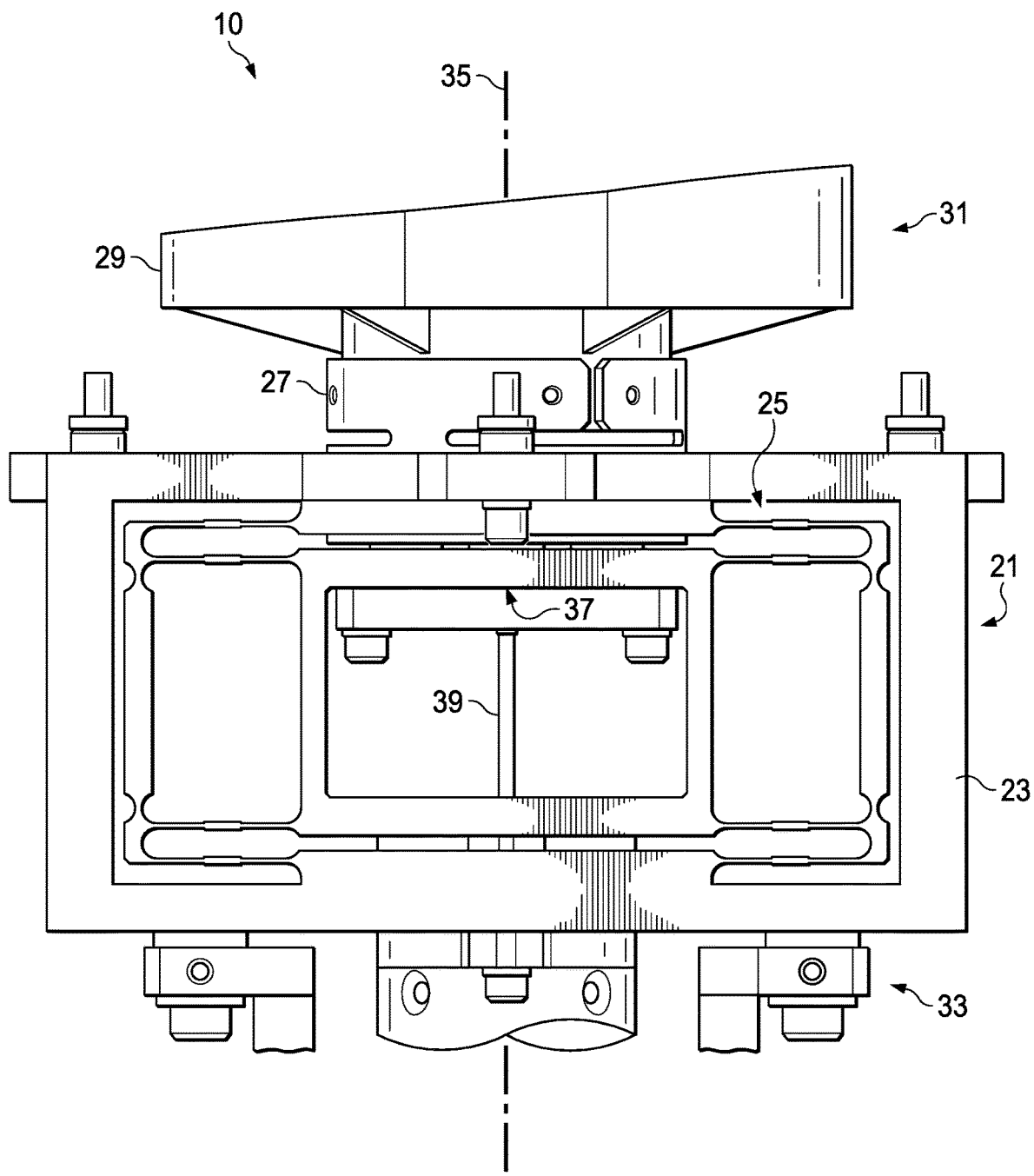

FIGS. 1 and 2 illustrate a first example optical focus mechanism 10 according to this disclosure. As shown in FIGS. 1 and 2, the optical focus mechanism 10 includes a compound flexure 21. In this example, the compound flexure 21 includes a frame 23 and a flexure 25 located within the frame 23. The frame 23 generally denotes a structure that includes the flexure 25 and that can be coupled to other components of the optical focus mechanism 10. The flexure 25 generally denotes a structure that can move within compound flexure 21 and relative to the frame 23.

The compound flexure 21 can be formed from any suitable material(s). For example, the compound flexure 21 could be formed from at least one of titanium, aluminum, steel, plastic, and a composite material. The compound flexure 21 can also be formed in any suitable manner, such as by machining a larger piece of material (e.g., via wire electrical discharge machining (EDM)) or by additive manufacturing. In addition, the compound flexure 21 and its components could have any suitable size, shape, and dimensions. In this particular example, the frame 23 denotes a hollow block with openings through which other structures pass for connection to the flexure 25, and the flexure 25 can have a hollow center. However, each of these components 23, 25 could be altered as needed or desired. In particular embodiments, the compound flexure 21 denotes a single monolithic structure formed at least partially by the frame 23 and flexure 25. Even when implemented in this manner, the flexure 25 is still at least somewhat movable relative to the frame 23.

A device 31 is coupled to the compound flexure 21. For example, at least part of the device 31 can pass through an opening of the frame 23 and be coupled to one side of the flexure 25, such as by using bolts or other connectors. When coupled to the flexure 25, movement of the flexure 25 relative to the frame 23 allows for movement of the device 31 relative to the frame 23. The device 31 denotes any suitable device that can be coupled to the flexure 25 and moved relative to the frame 23. In some embodiments, the device 31 denotes an optical instrument, such as an instrument that includes at least one of one or more lenses and one or more mirrors. In this example, the optical instrument includes a mirror cell 27 and a mirror 29, and the mirror cell 27 is coupled to the flexure 25. In particular embodiments, the mirror cell 27 can be formed from titanium, and the mirror 29 can be formed from silicon carbide. Note, however, that any other optical or non-optical devices could be used as the device 31.

An actuator 33 is also coupled to the compound flexure 21. For example, at least part of the actuator 33 can pass through an opening of the frame 23 opposite the device 31 and can be coupled to the opposite side of the flexure 25, such as by using bolts or other connectors. The actuator 33 generally operates to move the flexure 25 (and the device 31 coupled to the flexure 25) relative to the frame 23. The actuator 33 includes any suitable structure for moving the flexure 25, such as a stepper motor, a servo motor, a piezo motor, a voice coil, a manually-tuned fine pitch screw or a thermal expansion actuator. In some embodiments, the device 31, the actuator 33 and the flexure 25 are co-axial along a common axis 35. Also, in some embodiments, the flexure 25 can be axially symmetric about the axis 35. Note, however, that neither of these is necessarily required.

The actuator 33 can be configured to apply a force to the flexure 25 at an axial center 37 of the flexure 25 in an interior of the flexure 25. Depending on the implementation, the optical focus mechanism 10 may further include a center post or post flexure 39. The post flexure 39 can extend along the axis 35 and engage the flexure 25. In some embodiments, the post flexure 39 can extend partially into or completely through the flexure 25 (and partially or completely through the frame 23). In some embodiments, the center post or post flexure 39 can be formed integral with the frame 23 and the flexure 25 as part of the single, monolithic structure. This allows the center post or post flexure 39 to extend seamlessly from the interior of the flexure 25. Depending on the implementation, an end of the center post or post flexure 39 can be located inside the frame 23, flush with the frame 23, or external to the frame 23. An off-axis load can be transferred from the actuator 33 to the compound flexure 21 to cause the compound flexure 21 to deflect. Deflection can create undesirable deviations from the desired motion path of the device 31. The center post or post flexure 39 helps to reduce the off-axis portion of the load transferred from the actuator 33 to the compound flexure 21 when the actuator 33 is attached to the stationary frame 23 of the compound flexure 21.

As described in more detail below, the compound flexure 21 can include one or more blade elements that extend between and couple the frame 23 and the flexure 25. The blade elements provide compliance between the frame 23 and the flexure 25 along the axis 35, which allows the flexure 25 to move relative to the frame 23 along the axis 35. The blade elements also provide stiffness between the frame 23 and the flexure 25 along other axes, such as axes 36 and 38 that are perpendicular to the axis 35, which helps to resist movement of the flexure 25 in the off-axis directions. The stiffness along the axes 36 and 38 can help to prevent undesired movement of the device 31.

Although FIGS. 1 and 2 illustrate a first example of an optical focus mechanism 10, various changes may be made to FIGS. 1 and 2. For example, while described as being used here in an optical focus mechanism with an optical device 31, the compound flexure 21 could be used in any other suitable system. Also, the sizes, shapes, and relative dimensions of the components in FIGS. 1 and 2 are for illustration only.

Figure 3:
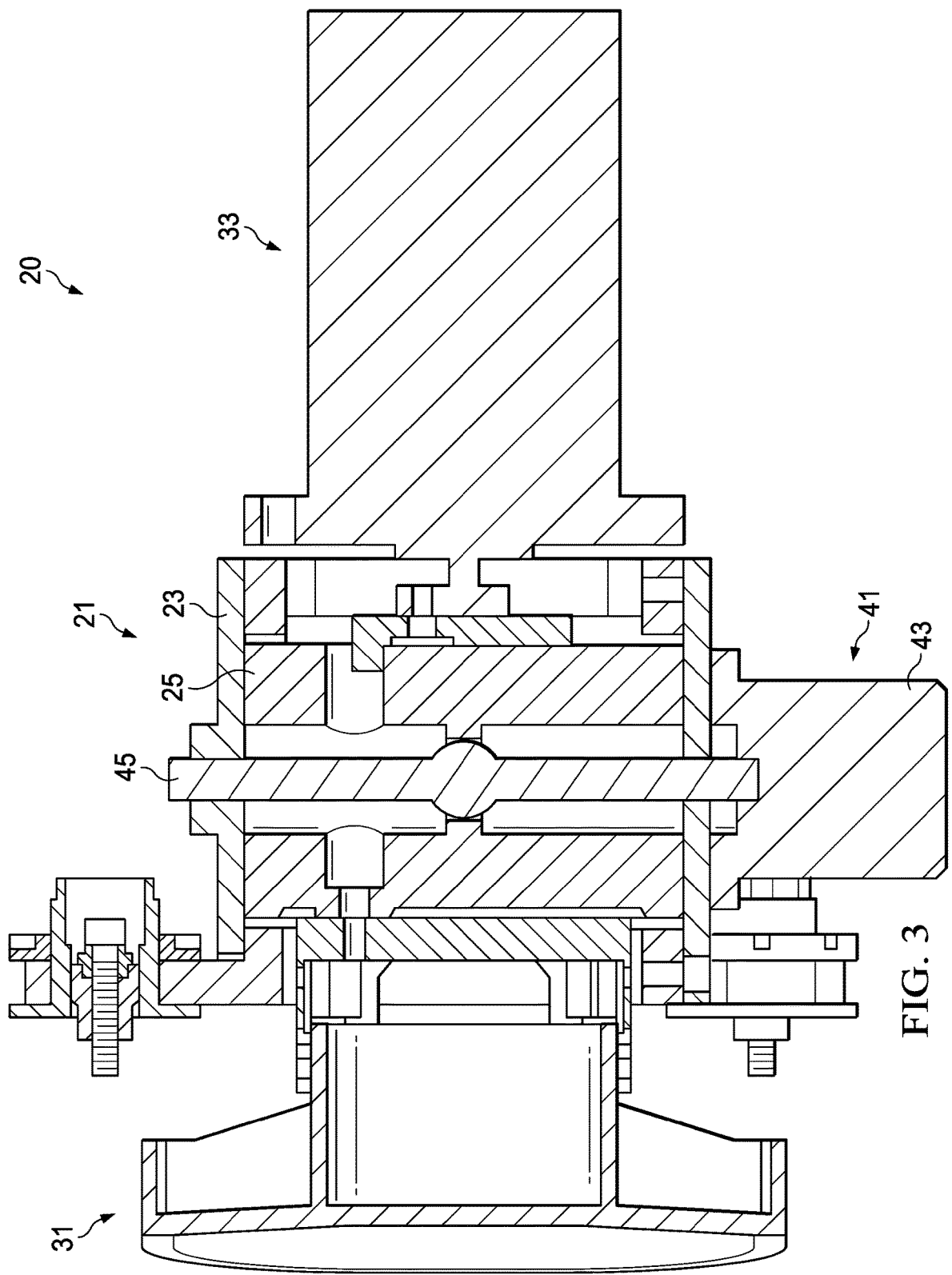
FIG. 3 illustrates a second example optical focus mechanism according to this disclosure.
Figure 4:
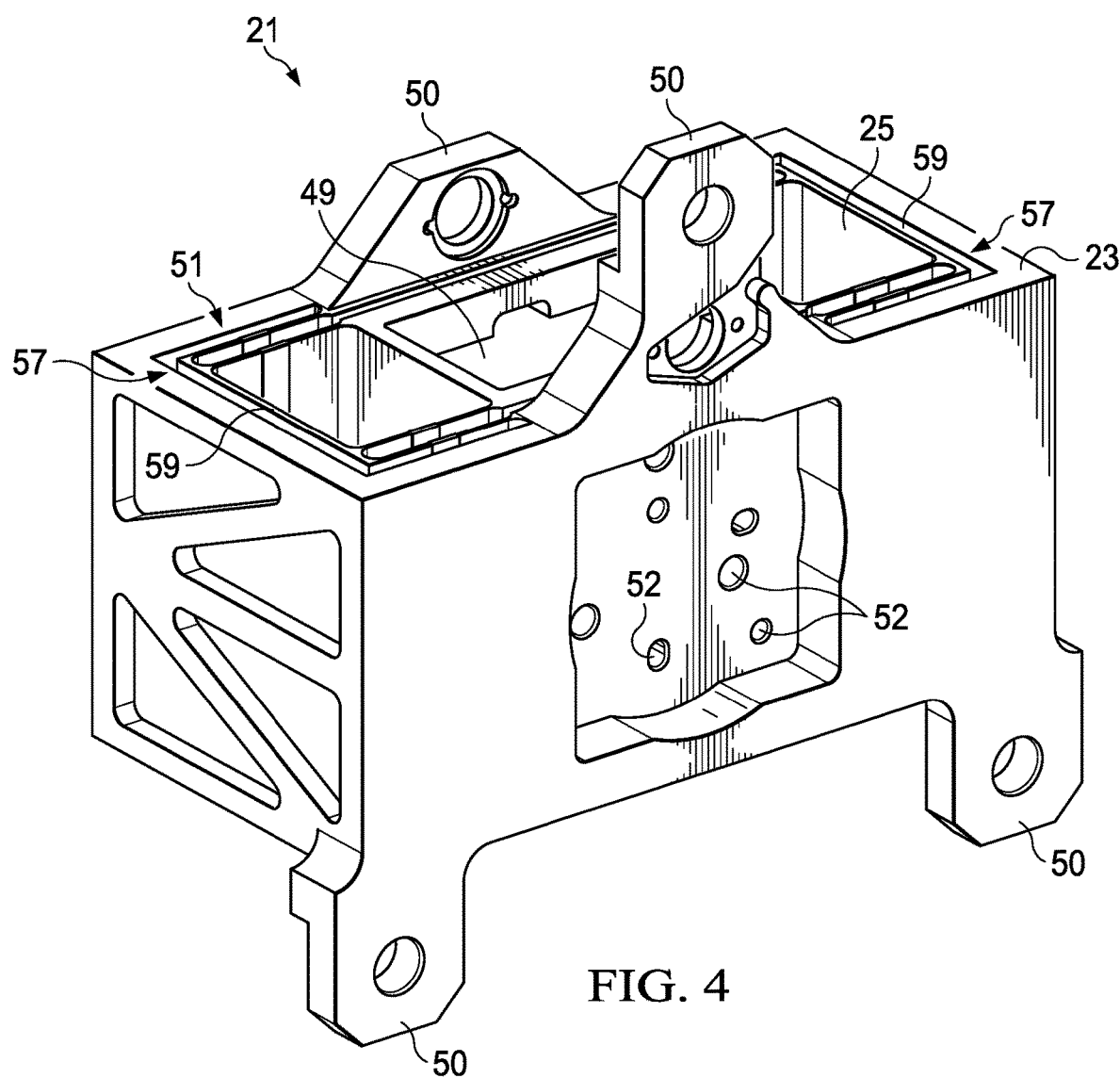
FIGS. 4 through 7 illustrate an example compound flexure for providing linear motion of a device according to this disclosure.
Figure 5:
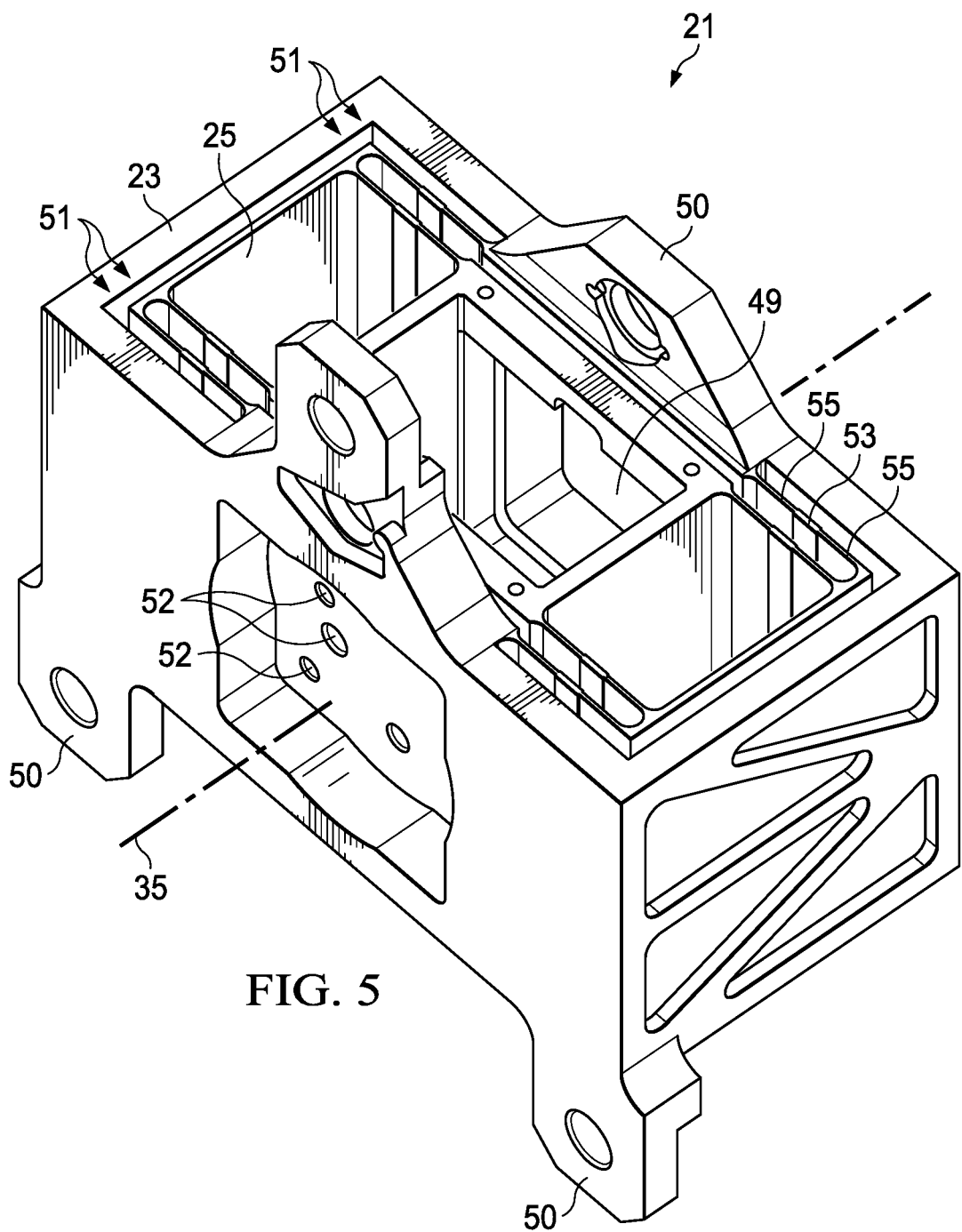
Figure 6:
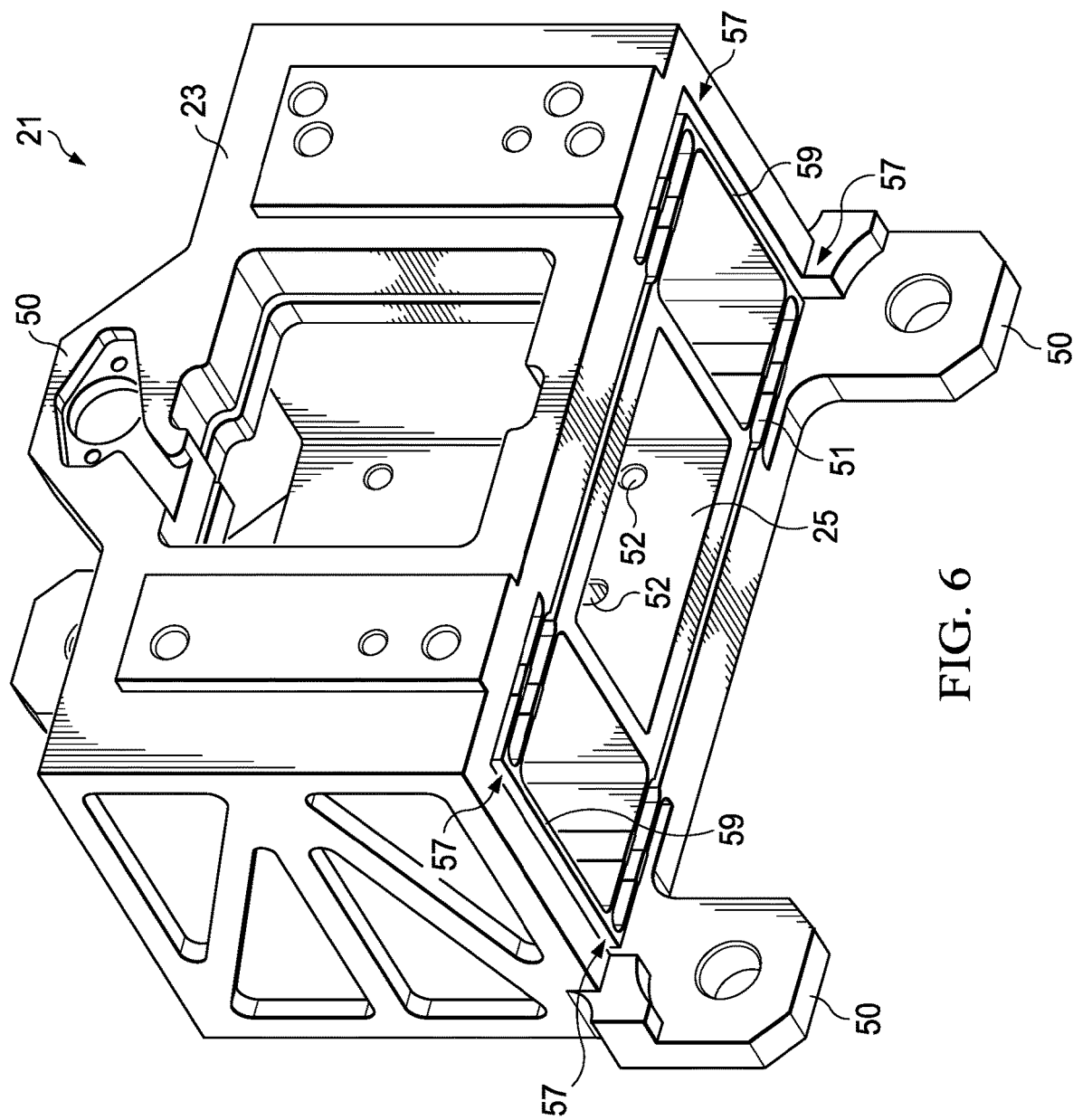
Figure 7:
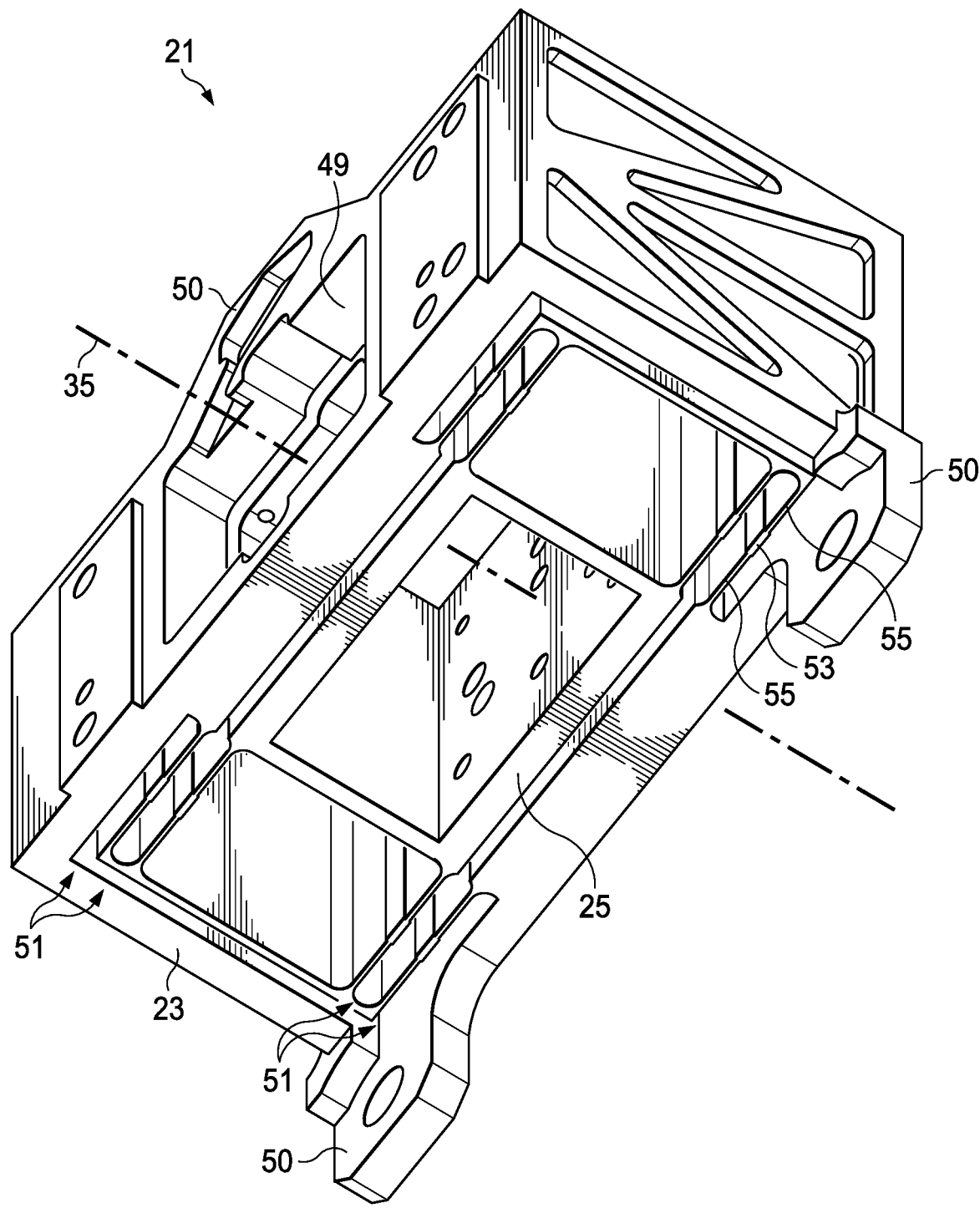

FIG. 3 illustrates a second example optical focus mechanism 20 according to this disclosure. As shown in FIG. 3, the optical focus mechanism 20 includes a compound flexure 21 having a frame 23 and a flexure 25, a device 31, and an actuator 33. These components could be the same as or similar to the components described above with respect to the optical focus mechanism 10 of FIGS. 1 and 2.

The optical focus mechanism 20 of FIG. 3 also includes a motion lock 41, which denotes a structure that can substantially prevent the flexure 25 from moving relative to the frame 23. The ability to prevent the flexure 25 from moving relative to the frame 23 may be needed or desired in various applications. For example, when the optical focus mechanism 20 is used in a satellite or other device that is launched from Earth into space, the launching of the optical focus mechanism 20 could (without the motion lock 41) cause the flexure 25 to move excessively and damage the compound flexure 21 or other components of the optical focus mechanism 20. The motion lock 41 helps to prevent this from occurring. Once at a desired location, the motion lock 41 can be removed or unlocked so that the flexure 25 is free to move relative to the frame 23.

In the example shown in FIG. 3, the motion lock 41 includes an integrated launch lock having an actuator 43 (such as a linear actuator, a servo motor or a paraffin actuator) that is removably attached to the frame 25. Other types of actuators 43 also can be used. A shaft 45 extends from the actuator 43, and the shaft 45 is configured to engage an interior of the flexure 25 to selectively keep the flexure 25 from moving relative to the frame 23. Before and during movement, the shaft 45 can be in a locked position that prevents the flexure 25 from moving relative to the frame 23. The shaft 45 can later be axially relocated by the actuator 43 to allow movement of the flexure 25 relative to the frame 23 for normal operation. Embodiments of a ball on the shaft 45 can be received in a ball-in-joint with a cylindrical sleeve as shown. The shaft 45 can be moved to the side by the actuator 43 to disengage the lock. Other embodiments of the motion lock 41 also can be used.

Although FIG. 3 illustrates a second example of an optical focus mechanism 20, various changes may be made to FIG. 3. For example, while described as being used here in an optical focus mechanism with an optical device 31, the compound flexure 21 could be used in any other suitable system. Also, the sizes, shapes, and relative dimensions of the components in FIG. 3 are for illustration only. In addition, other mechanisms could be used to lock the flexure 25 in place and reduce or prevent its movement relative to the frame 25.

FIGS. 4 through 7 illustrate an example compound flexure 21 for providing linear motion of a device according to this disclosure. For ease of explanation, the compound flexure 21 shown in FIGS. 4 through 7 is described as being used in the optical focus mechanisms 10 and 20 of FIGS. 1 through 3. However, the compound flexure 21 could be used in any suitable device or system.

As shown in FIGS. 4 through 7, the frame 23 here includes multiple openings 49 that allow the frame 23 to be coupled to other components. For example, the openings 49 can allow at least part of the device 31 and at least part of the actuator 33 (both are shown in FIGS. 1-3) to pass through the frame 23 and be coupled to the flexure 25. In this example, the openings 49 are generally rectangular with notches along their top and bottom sides, although any other suitable shape or shapes could be used.

The frame 23 also includes multiple projections 50 with openings through which bolts or other connectors can pass. This allows the frame 23 to be secured to or within a larger device or structure. Note that four projections 50 are shown here, three on one side of the frame 23 and one on the opposite side of the frame 23. However, the frame 23 could include any number of projections 50 in any suitable arrangement. Also, the projections 50 themselves and the openings in the projections 50 could have any suitable size, shape, and dimensions.

The flexure 25 also can include multiple openings 52 through which bolts or other connectors can pass. This allows the flexure 25 to be secured to or within another device or structure such as, for example, an embodiment of the post flexure 39 described below. Although a plurality of openings 52 are shown in flexure 25, the flexure 25 can include any number of openings 52 in any suitable arrangement. Also, the openings 52 could have any suitable size, shape and dimensions.

As described above, the compound flexure 21 can further include blade elements 51, which extend between and couple the flexure 25 to the frame 23. The blade elements 51 provide compliance for the flexure 25 with respect to the frame 23 by allowing the flexure 25 to move relative to the frame 23 along the axis 35. The blade elements 51 also provide stiffness for the flexure 25 with respect to the frame 23 along other axes (such as the axes 36 and 38 in FIG. 1) that are perpendicular to the axis 35.

The blade elements 51 could be formed from any suitable material(s) and in any suitable manner. In some embodiments, the blade elements 51 can be formed integral with the frame 23 and the flexure 25 as part of the single, monolithic structure. The blade elements 51 could also have any suitable size, shape, and dimensions. In some embodiments, each blade element 51 can include a variable thickness along its length. For example, at least one of the blade elements 51 can include a central portion 53 that is thicker than non-central portions 55 of the blade element 51. Of course, each blade element 51 could have any other suitable uniform or non-uniform thickness.

In some embodiments, the blade elements 51 can be substantially parallel to each other. Note, however, that this need not be the case. For instance, in an example where the frame 23 were larger, there could be blade elements 51 arranged orthogonally coupling the flexure 25 to the frame 23. Also, in some embodiments, the blade elements 51 can be arranged in pairs 57 of blade elements 51. In this example, the blade elements 51 or pairs 57 of blade elements 51 extend along the longer walls of the frame 23, although this configuration is for illustration only. In addition, the blade elements 51 or pairs 57 of blade elements 51 are connected by one or more walls 59, which here extend along the axis 35. In this arrangement, each pair 57 of blade elements 51 can at least partially surround or circumscribe part of an interior of the frame 23 and can at least partially surround or circumscribe a portion of the flexure 25.

Although FIGS. 4 through 7 illustrate one example of a compound flexure 21 for providing linear motion of a device, various changes may be made to FIGS. 4 through 7. For example, the sizes, shapes, and relative dimensions of the components in FIGS. 4 through 7 are for illustration only.

Figure 8A:
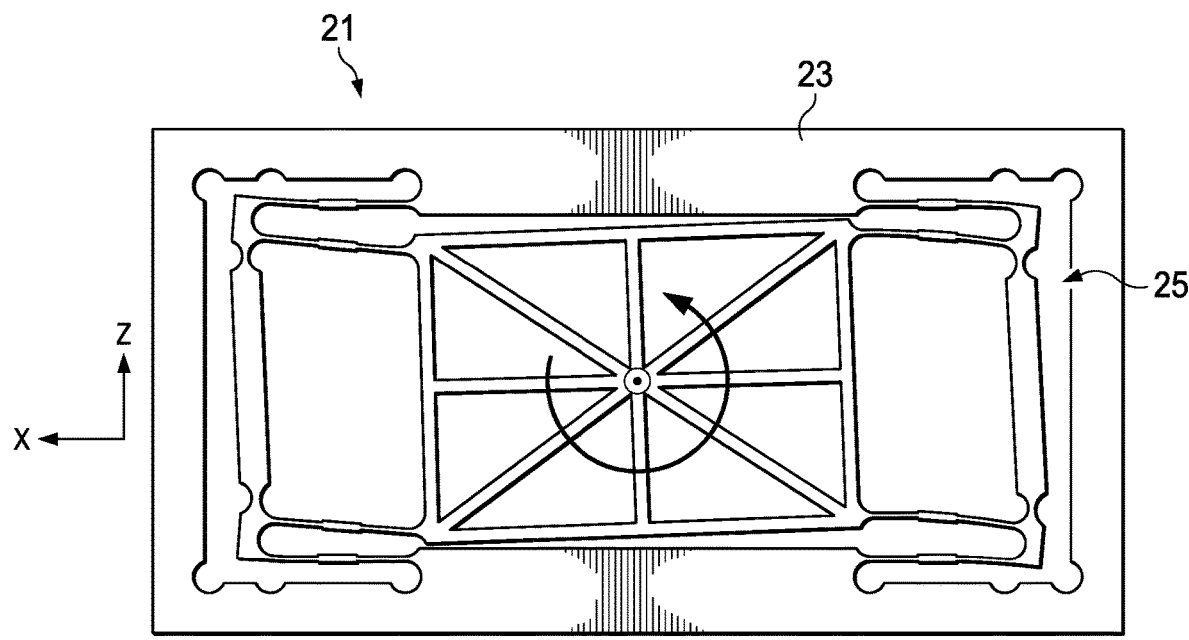
FIGS. 8A and 8B illustrate simulated examples of a compound flexure being subjected to different loads according to this disclosure.
Figure 8B:
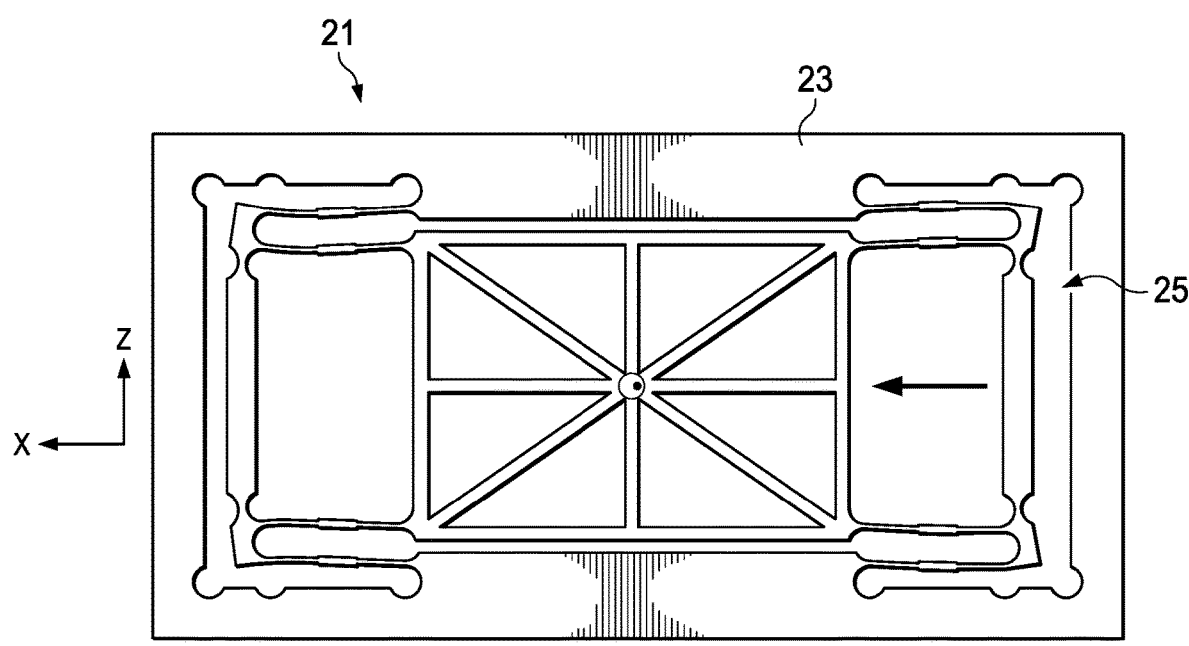

FIGS. 8A and 8B illustrate simulated examples of a compound flexure 21 being subjected to different loads according to this disclosure. In FIG. 8A, the compound flexure 21 is depicted as being subjected to a rotational load about the y-axis. In FIG. 8B, the compound flexure 21 is depicted as being subjected to a radial load along the x-axis.

Under either type of loading, embodiments of the compound flexure 21 disclosed here have stiffnesses that are significantly greater than those of conventional linear flexure bearings. In some embodiments, the compound flexure 21 can have an axial stiffness that is at least, for example, one hundred times greater than that of conventional linear flexure bearings. Versions of the compound can have a radial stiffness that is at least, for example, twenty to forty times greater than that of conventional linear flexure bearings. Other embodiments can have a rotational stiffness that is at least nine to thirty times greater than that of conventional linear flexure bearings. Note, however, that other embodiments of the compound flexure 21 could have lesser or greater stiffness(es) in any of the axial, radial, or rotational directions.

Figure 9A:
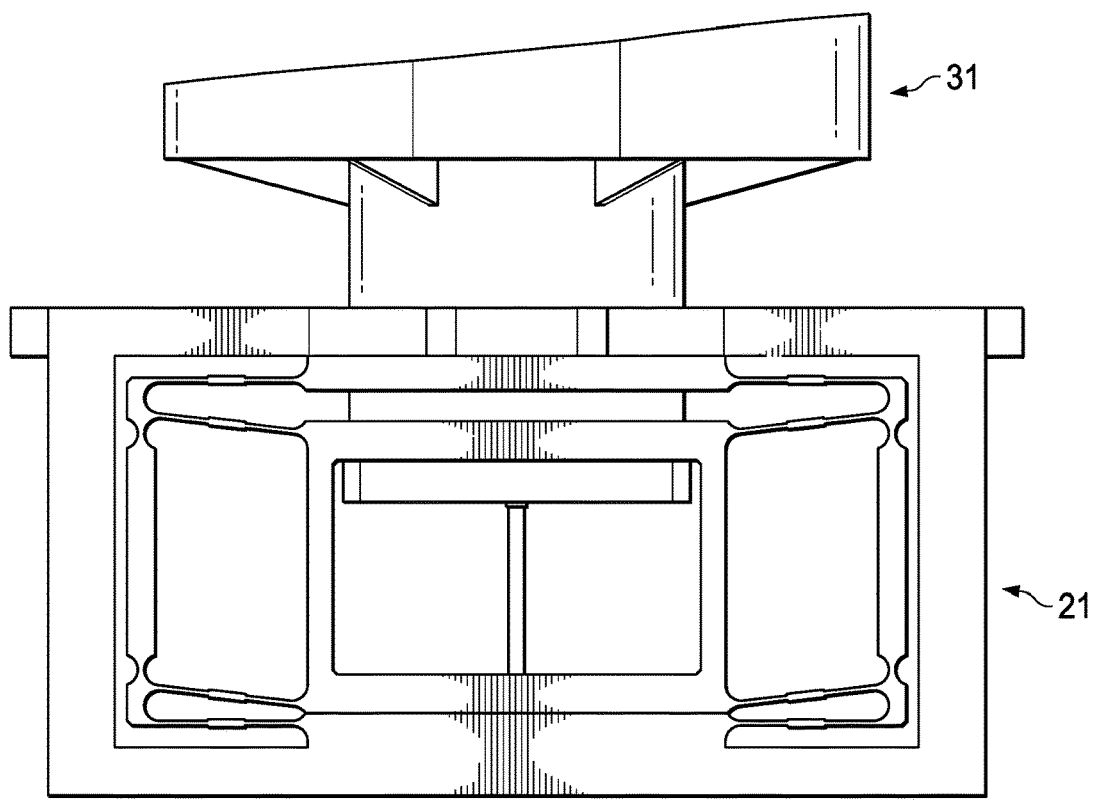
FIGS. 9A and 9B illustrate simulated examples of a compound flexure being subjected to different resonant vibration modes according to this disclosure.
Figure 9B:
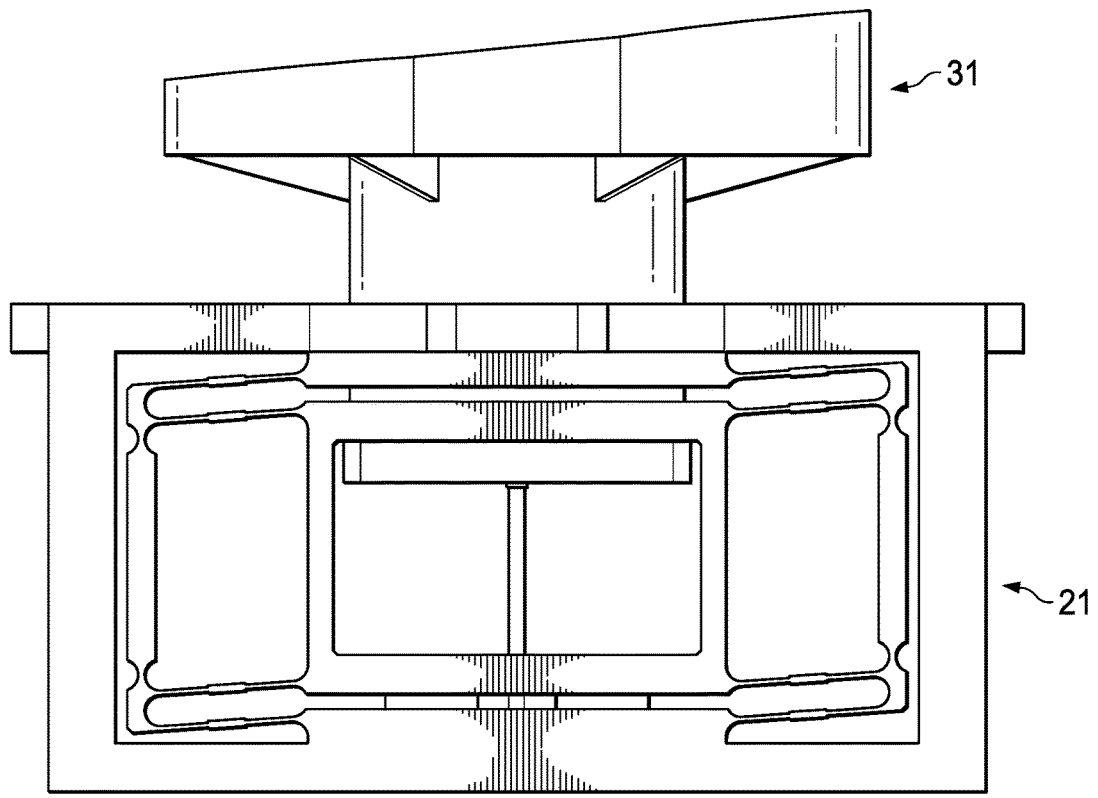

FIGS. 9A and 9B illustrate simulated examples of a compound flexure 21 being subjected to different resonant vibration modes according to this disclosure. In FIG. 9A, the compound flexure 21 is being subjected to a resonant frequency (Mode 1) of 143 Hz. In FIG. 9B, the compound flexure 21 is being subjected to a resonant frequency (Mode 2) of 585 Hz.

In either case, when the flexure 25 is driven relative to frame 23 by the actuator 33, the flexure 25 can experience substantially no tilt or off-axis movement. In some embodiments, the flexure 25 could experience less than 1 µRad of tilt about any of the three axes 35, 36, and 38 in FIG. 1 when subjected to a 10 mils stroke along the axis 35 (the z-axis). Also, in some embodiments, the flexure 25 could experience less than 0.1 mils of translation along the x-axis and y-axis when subjected to the 10 mils stroke along the z-axis. This approach can therefore help to significantly reduce undesired movement of the device 31 when undergoing linear movement.

In embodiments where the center post or post flexure 39 is used, the center post or post flexure 39 could be more stiff than the compound flexure 21 in the on-axis direction (along the axis 35, also called the z-axis) and less stiff than the compound flexure 21 in all off-axis directions. In particular embodiments, the center post or post flexure 39 could be thirty to one hundred times stiffer than the compound flexure 21 in the on-axis direction, while the compound flexure 21 could be one thousand to one hundred thousand times stiffer than the center post or post flexure 39 in the off-axis directions. In other particular embodiments, the center post or post flexure 39 could be fifty to seventy times stiffer than the compound flexure 21 in the on-axis direction, while the compound flexure 21 could be five thousand to ninety thousand times stiffer than the center post or post flexure 39 in the off-axis directions. Of course, these values are based on specific designs of the flexure 25 and the center post or post flexure 39, and other values could be obtained by altering the designs of the flexure 25 and the center post or post flexure 39.

Although FIGS. 8A through 9B illustrate simulated examples of operations involving the compound flexure 21, various changes may be made to FIGS. 8A through 9B. For example, these simulated examples are provided merely to demonstrate how particular embodiments of the compound flexure 21 could potentially operate. Other embodiments of the compound flexure 21 can operate in any other suitable manner.

It may be advantageous to set forth definitions of certain words and phrases used throughout this patent document. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus comprising:
a compound flexure comprising:
a frame having an axis;
a flexure located within the frame, the flexure movable relative to the frame, the frame and the flexure forming at least part of a monolithic structure; and
blade elements coupling the flexure and the frame; and
a post flexure extending along the axis and engaging the flexure;
wherein the blade elements are configured to (i) allow movement of the flexure along the axis relative to the frame and (ii) restrict movement of the flexure along other axes that are perpendicular to the axis.

2. The apparatus of claim 1, wherein:
the frame comprises a first opening configured to receive at least part of an actuator and a second opening configured to receive at least part of a device; and
the flexure is configured to be coupled on one side to the actuator and on an opposite side to the device.

3. The apparatus of claim 1, further comprising:
a motion lock configured to restrict movement of the flexure relative to the frame.

4. An apparatus comprising:
a compound flexure comprising:
a frame having an axis; and
a flexure located within the frame, the flexure movable relative to the frame, the frame and the flexure forming at least part of a monolithic structure;
a post flexure extending along the axis and engaging the flexure; and
a motion lock configured to restrict movement of the flexure relative to the frame;
wherein the motion lock comprises:
a shaft configured to engage an interior of the flexure to restrict movement of the flexure relative to the frame; and
an actuator configured to relocate the shaft to allow movement of the flexure relative to the frame.

5. The apparatus of claim 4, wherein:
the compound flexure further comprises blade elements coupling the flexure and the frame; and
the blade elements are configured to (i) allow movement of the flexure along the axis relative to the frame and (ii) restrict movement of the flexure along other axes that are perpendicular to the axis.

6. The apparatus of claim 1, wherein each blade element comprises a thicker central portion and thinner non-central portions.

7. The apparatus of claim 1, wherein:
the blade elements are arranged in pairs; and
the blade elements in each pair are substantially parallel to each other.

8. An apparatus comprising:
a compound flexure comprising:
a frame having an axis; and
a flexure located within the frame, the flexure movable relative to the frame, the frame and the flexure forming at least part of a monolithic structure; and
a post flexure extending along the axis and engaging the flexure;
wherein:
a stiffness of the post flexure along the axis is greater than a stiffness of the compound flexure along the axis; and
a stiffness of the post flexure along other axes is less than a stiffness of the compound flexure along the other axes.

9. The apparatus of claim 1, wherein the frame, the flexure, and the post flexure form at least part of the monolithic structure.

10. A system comprising:
a compound flexure comprising:
a frame having an axis;
a flexure located within the frame, the flexure movable relative to the frame, the frame and the flexure forming at least part of a monolithic structure; and
blade elements coupling the flexure and the frame;
a post flexure extending along the axis and engaging the flexure;

a device coupled to the flexure and configured to move with the flexure relative to the frame; and an actuator coupled to the flexure and configured to move the flexure and the device relative to the frame;

wherein the blade elements are configured to (i) allow movement of the flexure along the axis relative to the frame and (ii) restrict movement of the flexure along other axes that are perpendicular to the axis.

11. The system of claim 10, wherein the flexure, the device, and the actuator are co-axial along the axis.

12. A system comprising:
a compound flexure comprising:
    a frame having an axis; and
    a flexure located within the frame, the flexure movable relative to the frame, the frame and the flexure forming at least part of a monolithic structure;
a post flexure extending along the axis and engaging the flexure;
a device coupled to the flexure and configured to move with the flexure relative to the frame; and
an actuator coupled to the flexure and configured to move the flexure and the device relative to the frame;
wherein:
    the frame comprises a first opening configured to receive at least part of the actuator and a second opening configured to receive at least part of the device; and
    the flexure is configured to be coupled on one side to the actuator and on an opposite side to the device.

13. The system of claim 10, further comprising:
a motion lock configured to restrict movement of the flexure relative to the frame.

14. A system comprising:
a compound flexure comprising:
    a frame having an axis; and
    a flexure located within the frame, the flexure movable relative to the frame, the frame and the flexure forming at least part of a monolithic structure;
a post flexure extending along the axis and engaging the flexure;
a motion lock configured to restrict movement of the flexure relative to the frame;
a device coupled to the flexure and configured to move with the flexure relative to the frame; and
a first actuator coupled to the flexure and configured to move the flexure and the device relative to the frame;
wherein the motion lock comprises:
    a shaft configured to engage an interior of the flexure to restrict movement of the flexure relative to the frame; and
    a second actuator configured to relocate the shaft to allow movement of the flexure relative to the frame.

15. The system of claim 14, wherein:
the compound flexure further comprises blade elements coupling the flexure and the frame; and
the blade elements are configured to (i) allow movement of the flexure along the axis relative to the frame and (ii) restrict movement of the flexure along other axes that are perpendicular to the axis.

16. The system of claim 15, wherein:
the blade elements are arranged in pairs; and
the blade elements in each pair are substantially parallel to each other.

17. A system comprising:
a compound flexure comprising:
    a frame having an axis; and
    a flexure located within the frame, the flexure movable relative to the frame, the frame and the flexure forming at least part of a monolithic structure;
a post flexure extending along the axis and engaging the flexure;
a device coupled to the flexure and configured to move with the flexure relative to the frame; and
an actuator coupled to the flexure and configured to move the flexure and the device relative to the frame;
wherein:
    a stiffness of the post flexure along the axis is greater than a stiffness of the compound flexure along the axis; and
    a stiffness of the post flexure along other axes is less than a stiffness of the compound flexure along the other axes.

18. A method, comprising:
obtaining a single monolithic structure comprising a flexure and a frame of a compound flexure of a focus system, the flexure and the frame being coaxial, the frame having an axis, the flexure located within the frame and being movable relative to the frame;
co-axially coupling the focus system with an imaging system, the focus system configured to adjust a position of the imaging system; and
placing a post flexure of the focus system against the flexure, wherein the post flexure extends along the axis and is configured to transfer a force from the focus system to the flexure and the imaging system;
wherein blade elements coupling the flexure and the frame (i) allow movement of the flexure along the axis relative to the frame and (ii) restrict movement of the flexure along other axes that are perpendicular to the axis.

19. The method of claim 18, further comprising:
inserting a shaft of a motion lock to restrict movement of the flexure relative to the frame, the shaft engaging an interior of the flexure; and
coupling an actuator to the shaft, the actuator configured to relocate the shaft to allow movement of the flexure relative to the frame.

20. The method of claim 18, wherein:
a stiffness of the post flexure along the axis is greater than a stiffness of the compound flexure along the axis; and
a stiffness of the post flexure along other axes is less than a stiffness of the compound flexure along the other axes.

* * * * *